Aug. 6, 1940.  M. A. EDWARDS  2,210,805

CONTROL SYSTEM

Original Filed March 8, 1938

Inventor:
Martin A. Edwards,
by Harry E. Dunham
His Attorney.

UNITED STATES PATENT OFFICE 2,210,805

CONTROL SYSTEM

Martin A. Edwards, Schenectady, N. Y., assignor to General Electric Company, a corporation of New York Application March 8, 1938, Serial No. 194,613
Renewed February 13, 1940

4 Claims. (Cl. 171—242)

This invention relates to electrical control systems and more particularly to improvements in arrangements for controlling alternating current circuits, of the type having a neutral conducting path, by means of direct current saturated reactors.

Many alternating current circuits, both single phase and polyphase, are provided with a neutral which may either be a separate neutral conductor or a ground return.

For example, the center of most 220 volt alternating current single phase secondary distribution systems is grounded and many three-phase power circuits are Y-connected with the neutral either grounded or provided with a metallic return conductor.

If a conventional direct current controlled reactor is connected in one side or conductor of such a circuit it will tend to unbalance the circuit and cause unequal currents to flow in the main conductors. This causes a current to flow in the neutral and causes unbalanced voltages between the main conductors and the neutral. Such operation is usually uneconomical and otherwise undesirable.

If the separate alternating current coils of a conventional direct current saturated reactor are connected respectively in the main conductors of a circuit any unbalance, such as may be caused by an unbalanced load or a shift in the neutral voltage will induce an alternating potential and current in the direct current control winding. Such operation adversely affects the direct current control circuit and is usually undesirable.

In accordance with the present invention there is provided a novel direct current saturable control arrangement which automatically tends to maintain balanced condition of operation and which prevents the production of alternating current in the direct current control winding of a saturable reactor for controlling an alternating current circuit provided with a neutral or ground return.

An object of the invention is to provide a new and improved electrical control system.

Another object of the invention is to provide a new and improved direct current saturable reactor control system.

A still further object of the invention is to provide a new and improved direct current saturable reactor control system for alternating current circuits which are provided with a neutral or ground return.

The invention will be better understood from the following description taken in connection with the accompanying drawing and its scope will be pointed out in the appended claims.

Figure 1:
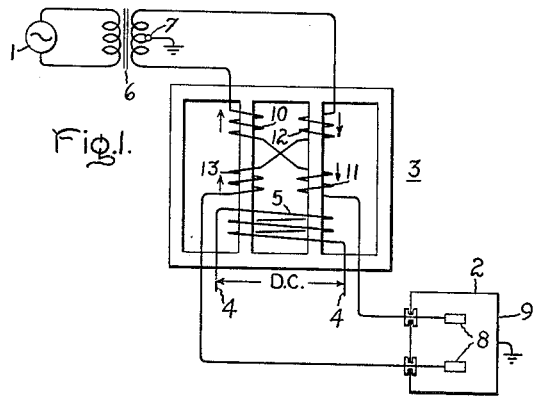
Figure 2:
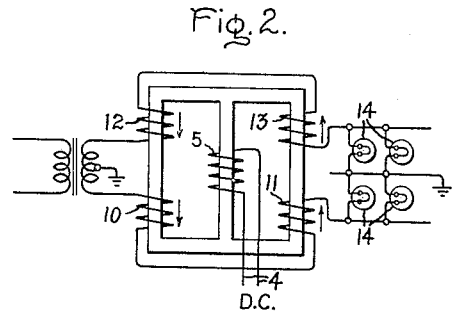
Figure 3:
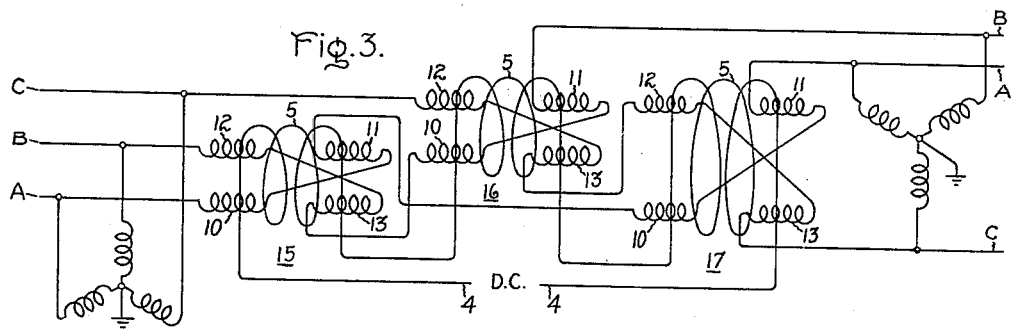
Figure 4:
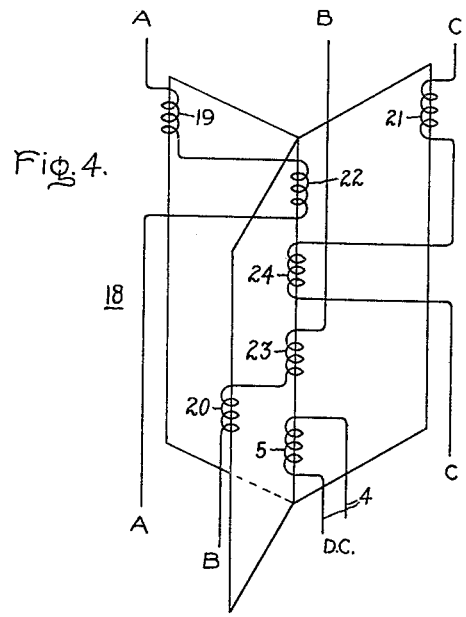

In the drawing, Fig. 1 illustrates diagrammatically an embodiment of my invention applied to a four-legged core reactor for controlling a single phase grounded neutral circuit, Fig. 2 is a similar circuit using a three-legged core reactor, Fig. 3 is a modification using three of the reactors shown in Fig. 1 or 2 for controlling a three-phase circuit and Fig. 4 is a unitary three-phase reactor for controlling a three-phase grounded neutral circuit.

Referring now to the drawing and more particularly to Fig. 1, there is shown therein an alternating current system comprising a source of alternating current in the form of a conventional generator 1 for supplying current to a single phase load 2 through a four-legged core saturable reactor 3 having a direct current control circuit 4 containing a saturating winding 5 wound on the two center legs of the four-legged core. Interposed between the generator 1 and the reactor 3 is a transformer 6 provided with a secondary winding having a grounded midpoint 7. The load 2, which may be of any suitable type, is shown by way of example as comprising a pair of insulated electrodes 8 in a grounded chamber 9. This device may be an arc furnace or an electrolytic tank or a liquid heating device such as may be used in a milk pasteurizer or sterilizer.

In such load devices it is desirable to maintain both the electrodes at an equal potential above ground and also to maintain equal electrode current, as this balanced operation is most economical and does not overwork one-half of the circuit while underworking the other half of the circuit. In order to secure this result with a unitary reactor whose direct current control circuit will be independent of accidental unbalance of the circuit there are provided four alternating current windings 10, 11, 12 and 13 arranged in a special way. Windings 10 and 11 are connected in series and are each wound on a different one of the two center legs of the core while windings 12 and 13 are connected in series in the other side of the circuit and are also each wound on a different one of the two center legs of the core. Windings 10 and 13 are so connected that their instantaneous polarities are in the same direction and windings 11 and 12 are so wound that their instantaneous polarities are in the same direction with respect to each other but in the opposite direction with respect to windings 10 and 13, as is indicated by the instantaneous polarity arrows on the drawing.

All four windings 10, 11, 12 and 13 normally have the same number of turns so that for balanced operation they are equal.

If now the circuit should become unbalanced for any reason, such as because of a shift in neutral voltage, the increase in current in one side of the circuit cannot produce a differential alternating flux with respect to the direct current winding 5 because if the side of the circuit containing the windings 10 and 11 has its current increased the windings 10 and 11 will produce equal increases in flux in the center legs, whereas if the side of the conductor containing the windings 12 and 13 has its current increased these two windings will produce equal increases in flux in the two center legs. Thus, no amount of unbalance in the circuit can affect the control winding 5.

The use of a set of reactor coils in each side of the line tends to keep the load voltage symmetric with respect to ground and to reduce ground current in case there is an unbalance as there is a greater voltage drop in the set of coils carrying the greater current due to their resistance and leakage reactance.

By varying the amount of current in the control circuit 4 the direct current flux produced by the winding 5 will change the permeability of the core of the reactor, thus, changing the effective reactance of the windings 10, 11, 12 and 13, whereby the load current or voltage may be controlled in any desired manner.

In Fig. 2 the invention is shown applied to a three-legged core reactor. As shown the arrangement is such that windings 10 and 12 are wound on one outer leg with cumulative instantaneous polarities while windings 11 and 13 are wound on the other leg with cumulative instantaneous polarities such that all four windings may be considered as either circulating flux through the left and right hand legs and the upper and lower portions of the core to the exclusion of the center leg or they may be so considered that windings 10 and 12 circulate flux in one direction in the center leg and windings 11 and 12 circulate an equal and opposite flux at the same instant in the center leg. From either point of view no alternating flux traverses the center leg and, consequently, no alternating potential is produced in the direct current control winding 5. Furthermore, any unbalance in current in the main circuit will affect the flux in the two outer legs equally so that no effect will be produced on the control winding 5.

The load in Fig. 2 is shown as a plurality of lamps 14 each of which is connected between one of the main or outer conductors of the circuit and a grounded neutral conductor.

By controlling the amount of direct current in the control circuit 4 in any well known manner the illumination of the lamps 14 may be controlled at will throughout a wide range in a manner well understood by those skilled in the art.

In Fig. 3 the invention is extended to a three-phase Y-connected grounded neutral circuit A, B and C by the use of three reactors 15, 16 and 17 which are similar in construction to the reactor of either Fig. 1 or Fig. 2. Reactor 15 has its four alternating current windings connected in lines A and B, reactor 16 has its four alternating current windings connected in lines B and C and reactor 17 has its four alternating current windings connected in lines A and C. The control circuit 4 has the three direct current saturating windings 5 connected in series.

In each reactor the windings 10 and 11 balance each other with respect to inducing an alternating voltage in the direct current winding 5 and likewise the windings 12 and 13 balance each other with respect to inducing an alternating potential in the direct current saturating winding 5. This is true whether or not the currents in the lines are equal or unequal so that regardless of whether or not the circuit is balanced no alternating potential will be induced in any of the three direct current windings 5. Consequently, these windings may be connected in parallel instead of in series, if desired. The series connection, however, is preferable as it insures that exactly the same current will flow in each direct current winding so that if these windings all have the same number of turns they will produce the same magnetizing effect in the core of each reactor.

In Fig. 4, a unitary three-phase reactor arrangement is provided on a Y-shaped four-legged core. The arrangement is similar to a conventional three-phase reactor in that a winding 19 is wound on one leg and is connected in phase A, a winding 20 is wound on another leg and is connected in phase B and a winding 21 is wound on a third leg and is connected in phase C while the direct current saturating winding 5 is mounted on the common or fourth leg of the four-legged Y-shaped core 18. It differs from a conventional three-phase reactor in that three alternating current windings 22, 23 and 24 are added to the center leg. These windings are connected respectively in series with the windings 19, 20 and 21. During balanced operation their three fluxes add up to zero so that they produce no effect on the direct current saturating winding 5. It can also be shown that during unbalanced operation the phase of the currents shift in such a way that there is no resultant alternating potential induced in the control winding 5.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current circuit having a pair of main conductors and a neutral return path whereby the connection of unequal impedances between said conductors and said return path will cause unequal currents to flow in said main conductors, a pair of magnetically saturable iron flux paths, a direct current circuit for saturating both of said paths with uni-directional flux, a pair of alternating current windings on one of said iron flux paths, and a second pair of alternating current windings on the other of said flux paths, one winding of each pair being serially connected in one of said main conductors, the remaining winding of each pair being serially connected in the other of said main conductors, each of said alternating current windings having the same number of turns, the individual windings of each of said pairs having opposite instantaneous polarities with respect to said direct current circuit.

2. In combination, a four-legged iron core having a pair of center legs and a pair of outer spectively on the center legs of said core, said windings being serially connected in a conductor of an alternating current circuit, two more oppositely acting windings mounted respectively on said center legs, said two more windings being serially connected in another conductor of said alternating current circuit, all four of said windings having equal turns, the windings on one center leg acting cumulatively in one direction and the windings on the other center leg acting cumulatively in the other direction, and a direct current winding wound around both of said center legs.

3. In combination, a three-phase direct current saturable reactor having three outer legs and a fourth common center leg, three sets of windings, each set comprising a serially-connected pair of windings, one winding of each pair being connected on a different outer leg and the other winding of each pair being connected on the center leg, the windings of each pair being adapted to be connected in a different phase of a grounded neutral three-phase alternating current circuit, and a direct current saturating winding on said center leg.

4. In combination, a polyphase direct current saturable core reactor comprising in combination, a core having as many legs as there are phases of an alternating current circuit, said core having a common return leg for all of said first mentioned legs, a direct current saturating winding on said common leg, a separate alternating current winding for each of the phases of said circuit wound on a different one of said first mentioned legs, as many alternating current windings as there are phases wound on the common leg of said core, each winding on said first mentioned legs being serially-connected with a different one of said windings on said common leg, said serially-connected pairs of windings being adapted to be connected respectively in the phases of said polyphase circuit.

MARTIN A. EDWARDS.